Nov. 19, 1935. J. H. DAVIS Re. 19,759
AIR CONDITIONING APPARATUS FOR PASSENGER CARS
Original Filed Oct. 19, 1929 2 Sheets-Sheet 1
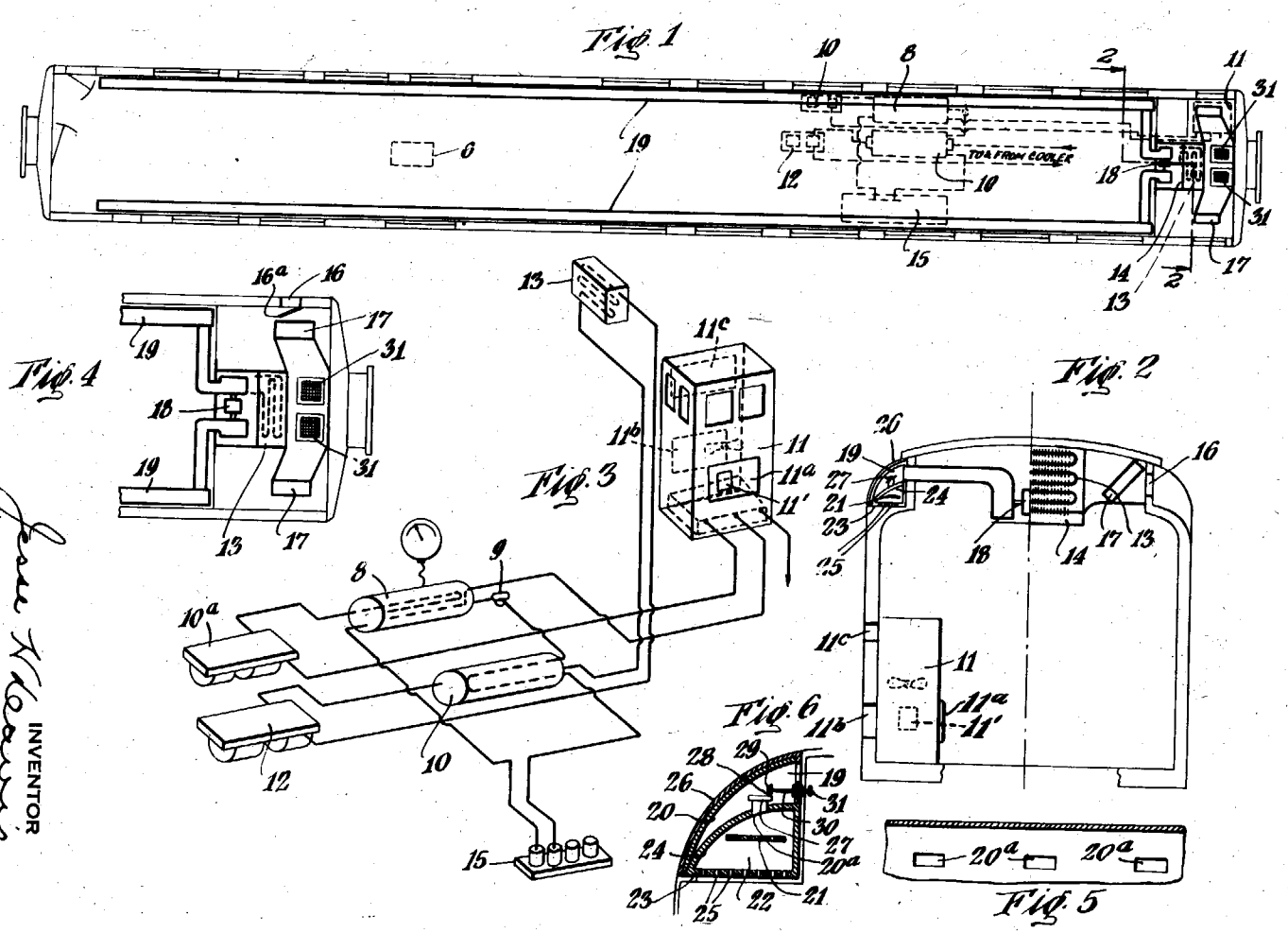
Jesse H. Davis INVENTOR
BY
Lawrence S. Clarkson ATTORNEY Nov. 19, 1935. J. H. DAVIS Re. 19,759

AIR CONDITIONING APPARATUS FOR PASSENGER CARS

Original Filed Oct. 19, 1929 2 Sheets-Sheet 2

Inventor:

Jesse H. Davis,

By Irwin S. Clarkson,

Attorney.

Reissued Nov. 19, 1935 Re. 19,759

UNITED STATES PATENT OFFICE 19,759

AIR CONDITIONING APPARATUS FOR PASSENGER CARS

Jesse H. Davis, Baltimore, Md., assignor to B. F. Sturtevant Company, Boston, Mass., a corporation of Massachusetts Original No. 1,843,210, dated February 2, 1932, Serial No. 400,929, October 19, 1929. Application for reissue February 2, 1932, Serial No. 590,525

3 Claims. (Cl. 98—10)

The objects of my invention are the conditioning of air in passenger carrying cars, freeing it from all dust, soot, cinders and other foreign matter, controlling the temperature and the humidity thereof, and the elimination of all drafts.

In the drawings, which are more or less diagrammatic:

Figure 1 is a top plan view of a car equipped with my invention;

Figure 2 is a vertical sectional view on the line 2—2 of Figure 1;

Figure 3 is a diagrammatic view of conditioning equipment designed to carry out my invention;

Figure 4 is a top plan view of one end portion of Figure 1;

Figure 5 is a top plan view of a portion of the half deck roof, showing the air distributing ducts, Figure 6 is an enlarged detail sectional view through the half deck of a car and the air conduit.

Figure 7:
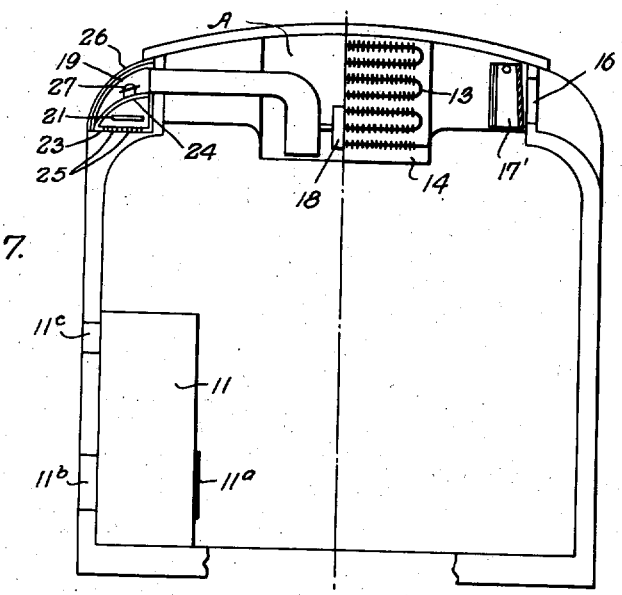
Figure 7 is a view similar to Figure 2, showing the use of a water spray filter instead of a mechanical filter.

In Figure 1 of the drawings, I have shown a typical layout for air conditioning equipment for an individual car system; that is to say, this car is a unit completely equipped with the necessary generating and refrigerating facilities for air conditioning.

To provide the electrical energy required for the air conditioning equipment a nominal 10 kilowatt, 110 volt, direct current generator 6, is mounted beneath the car floor and is driven by a positive drive from the car axle. In addition, the necessary regulator for maintaining a constant voltage above a certain critical speed, the necessary automatic switch, etc., are provided. In addition, the car may be equipped with a rotary converter whereby alternating current from wayside points, such as depots and yards, may be converted to direct current so that the air conditioning equipment may be operated while the car is standing still.

A motor driven compressor 15 of proper capacity is mounted beneath the car floor, and compressed ammonia is delivered thereby to the condenser tank 8 beneath the car floor. The hot ammonia is cooled by passing over water coils in the condenser tank 8. The liquefied ammonia is then passed through an expansion valve 9 and delivered to the evaporator tank 10 beneath the car floor. Here it circulates through tubes surrounded by water and during the expansion through these tubes chills the water in the evaporator tank. From the evaporator the ammonia passes back to the low pressure side of the compressor.

The water contained in the tubes of the condenser 8 becomes heated due to cooling the compressed ammonia, and it is circulated by means of the pump 10a and delivered to the center point of the cooling tower 11 in the corner of the car. Here the water is sprayed from sprayer 11', air from within or outside of the car is drawn through the sprayed water, thus cooling the water by evaporation back to about the wet bulb temperature of the air. The water is then available for reuse in the tubes of the condenser. The tower 11 is provided with a suitably closed inlet 11a for admitting air thereto from within the car, with a suitably closed inlet 11b for admitting air thereto from the outside of the car, and with an outlet 11c at the top for discharging the heated air therefrom to the external atmosphere.

The chilled water in the evaporator 10 is taken by the pump 12 and is delivered to the surface cooler 13 located overhead in the air conditioning compartment A located in the half deck zone at one end of the car. This cooler 13 consists of suitable form of piping of proper material to which is attached fins 14 for increasing the radiating surface, the coils being so arranged that as the air passes over the same, the heat in the air will be given up to the surfaces of the cooler.

Figure 8:
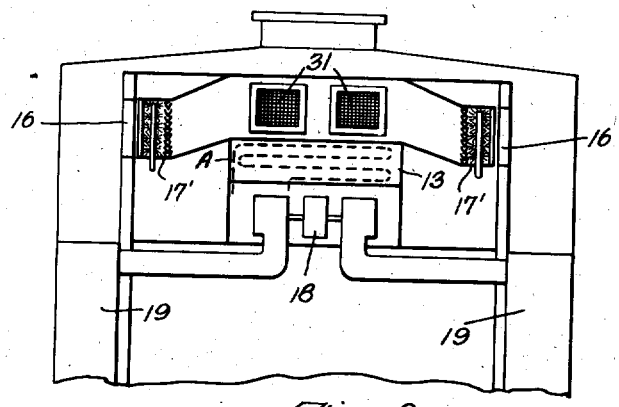
Figure 8 is a view similar to Figure 4 showing the organization disclosed in Figure 7.
Figure 9:
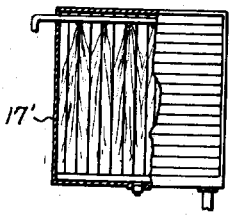
Figure 9 is a view partly in elevation and partly in section of the water spray filter shown in Figures 7 and 8.

Normally the air in the car will be recirculated between the passenger space and the conditioning compartment, but provision is made by means of a duct 16 for the admission of the desired amount of outside fresh air into the air conditioning compartment. This is controlled by a suitable damper 16a. The outside fresh air is passed through an air filter, which may be of a mechanical design, as shown at 17 in Figures 1, 2 and 4, or of the water spray type, as shown at 17' in Figures 7, 8 and 9, which spray type filter may be included in a suitable water supply circuit. The mechanical type of air filter is preferably used because it occupies less space, weighs less, and its cost is less than the spray type of air filter, but the spray type filter may be used when it is desired to filter the air by a washing action and to humidify it to a desired degree before cooling it.

After the air is cooled by passing over the surface cooler 13, it is then drawn into the motor driven centrifugal fans 18, and delivered to the air ducts 19 on each side of the car at the half deck. As shown in Figures 2 and 6, these ducts are covered with insulation 20 so as to prevent the chilled air within the duct from becoming heated due to the outside light and the sun as well as the hot outside air during the summer time.

It being preferable to maintain the present pleasing lines of the interior of the car, I avail myself of the space 22 now in present construction in the half deck between the plate 23 and the half deck roof 24, the only change in the plate 23 is that I provide it with perforations or suitable grille work 25. Over the half deck roof 24, I secure a plate 26 extending substantially the length of the car, thereby forming an air duct 19. The sheet or plate 26 is provided on the inside with suitable insulation 20. In the half deck roof 24, I provide at suitable intervals openings 20a which establish communication between the duct 19 and the space 22, through which the treated air may pass from the duct into the space 22, and in order to prevent objectionable drafts from entering the car, I provide a perforated baffle 21, suitably secured in the space 22 under, but spaced from the openings 20a. The air passes from the space 22 into the car through the perforations 25 of the half deck plate 23. In order that the admission of the conditioned air into the car may be under control, I provide dampers 27 for the openings 20a which may be operated in any suitable manner from within the car, and merely for purposes of illustrating some means for operating these dampers, I have shown the damper provided with a rack 28 which is engaged by a pinion 29 mounted on the operating rod 30 having a hand wheel 31 in the car, but, of course, it will be understood that I do not limit myself to this construction of damper operating means, as there are other means that may be employed for this purpose. If it is found that the conditioned air has a tendency to discharge into that end of the car near the cooler in too great a volume, this can be corrected by closing some of the dampers at that end, thus directing the air discharge further back into the car.

The air from the interior of the car is conducted through the ventilators 31 to the surface cooler 13 in compartment A and obviously air from the water tower also passes to compartment A through the duct or connection 11c.

While I have shown a preferable location for the air ducts 19, it is obvious that other dispositions and locations for these ducts may be adopted without departing from the spirit of my invention.

While I have named "ammonia" as the refrigerant, it is, of course, understood that any suitable refrigerant may be used.

What I claim is:

1. In combination, in a temperature regulating device for passenger cars, an air duct on the roof of the half deck of the car, ports extending from said duct through said roof, a half deck plate spaced from said roof to form a chamber in communication with said ports, and other ports leading from said chamber into the car.

2 In combination, in a temperature regulating device for passenger cars, an air duct on the half deck roof of the car, a perforated half deck plate spaced from the roof, a wall extending from said plate to the said roof forming a chamber, ports leading from the air duct into said chamber, and a baffle plate in said chamber below said ports.

3. In combination, in a temperature regulating device for passenger cars, air ducts on the half deck roof of the car, a perforated half deck plate spaced from the roof, a wall extending from said plate to the said roof forming a chamber, ports leading from the air ducts into said chamber, and a baffle plate in said chamber below said ports, and dampers controlling said ports.

JESSE H. DAVIS.